United States Patent [19]
Langstein et al.

[11] Patent Number: 6,156,859
[45] Date of Patent: *Dec. 5, 2000

[54] PROCESS FOR PRODUCING HIGHLY BRANCHED POLYISOOLEFINS

[75] Inventors: Gerhard Langstein, Kürten; Werner Obrecht, Moers, both of Germany; Judit Eva Puskas, London, Canada; Oskar Nuyken, München; Karin Weiss, Bindlach, both of Germany

[73] Assignee: Bayer AG, Leverkusen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/888,253

[22] Filed: Jul. 7, 1997

[30] Foreign Application Priority Data

Jul. 15, 1996 [DE] Germany ............................ 196 28 450

[51] Int. Cl.[7] ...................................................... C08F 4/12
[52] U.S. Cl. ..................... 526/226; 526/348.6; 526/348.7
[58] Field of Search ................................ 526/226, 348.7, 526/348.6

[56] References Cited

U.S. PATENT DOCUMENTS

| | | | |
|---|---|---|---|
| 3,948,868 | 4/1976 | Powers | 260/80.7 |
| 4,074,035 | 2/1978 | Powers | 526/185 |
| 5,084,522 | 1/1992 | Frechet | 525/333.4 |
| 5,458,796 | 10/1995 | Storey et al. | 252/58 |

FOREIGN PATENT DOCUMENTS

| | | |
|---|---|---|
| 344 021 | 1/1989 | European Pat. Off. . |
| 320 263 | 6/1989 | European Pat. Off. . |
| 320263 | 6/1997 | European Pat. Off. . |

OTHER PUBLICATIONS

T.M. Marsalki, I. Najoros, and J. P. Kennedy, "Multi–arm star polyisbutylenes" in *Polymer Bulletin 31*, 1993, pp. 665–672.

H. C. Wqang, K. W. Powers, and J. V. Fusco, "Star Branched Butyl– a novel butyl rubber for improved processability" (Introduction only) Paper No. 21 presented at a meeting of the Rubber Division, American Chemical Society, Mexico City, Mexico, May 9–12, 1989, p. 1.

J. P. Kennedy and B. Ivan, "Designed Polmers by Carbocationic Macromolecular Engineering: Theroy and Practice", 1991, pp. 5–31.

*Primary Examiner*—David W. Wu
*Assistant Examiner*—Caixia Lu
*Attorney, Agent, or Firm*—Connolly Bove Lodge & Hutz LLP

[57] ABSTRACT

Highly branched polyisoolefines are produced according to the invention by the polymerization of isoolefines in a single-stage process, in solution, suspension or in the gas phase in the presence of bifunctional monomers which contain at least one group capable of cationic polymerization and at least one group which serves as an initiator for the cationic polymerization of isoolefines (inimer), at temperatures from +20 to −100° C., optionally in the presence of inert, organic solvents, and in the presence of alkylalumoxanes (coinitiator).

15 Claims, No Drawings

PROCESS FOR PRODUCING HIGHLY BRANCHED POLYISOOLEFINS

BACKGROUND OF THE INVENTION

1. Field of the Invention

This invention relates to a process for producing highly branched polyisoolefines by the reaction of isoolefines, optionally in combination with conjugated or non-conjugated dienes and/or cationically polymerisable, singly- or multiply-unsaturated compounds, in a single stage process in solution, suspension or in the gas phase.

2. Description of the Prior Art

The cationic polymerisation of isoolefines has long been known, and is described by J. P. Kennedy and B. Iván in Carbocationic Macromolecular Engineering (1991), for example. On account of their physical properties, the butyl rubbers and halobutyl rubbers produced in this manner are used in industry, particularly for the production of tyre tubes and inner liners for tyres. In this connection, the processing properties of the butyl rubbers produced in this manner during compounding, rolling, extrusion and calendering are particularly important. The processing properties are associated in particular with a balanced ratio of the green strength of the rubber and to the stress relaxation thereof. This can be achieved, for example, by blending corresponding polymers with different molecular weights to form products having a custom-made, broad molecular weight distribution. This process is laborious, however. The direct synthesis of butyl rubbers which exhibit a broad molecular weight distribution and random long-chain branching and which have the desired processing properties can be accomplished, for example, by the copolymerization of isobutene with isoprene in the presence of bifunctional monomers such as divinylbenzene, 2,5-hexadiene or vinyl-benzyl chloride. However, one significant disadvantage of this copolymerisation is the formation of high proportions of gels in the rubber (see H. -C. Wang, K. W. Powers, J. V. Fusco, ACS Meeting, May 1989 Paper No. 21, for example).

Another method of introducing long chain branching occurrences was therefore introduced, namely the copolymerisation of isobutene and isoprene in the presence of multi-functional branching agents. The latter are to be understood as soluble polymers which contain functional groups, and which under the process conditions either initiate polymerisation ("grafting from" by tertiary alkyl groups) or react with the cationic end of the growing polymer chain ("grafting onto" by reactive double bonds). Hydrochlorinated poly(styrene-coisoprenes), chlorinated polystyrenes, polyisoprenes or styrene-butadiene block copolymers have been mentioned as multi-functional branching agents (H. C. Wang, K. W. Powers, J. V. Fusco, ACS Meeting, 9-12.05.1989; EP-A 320 263). The resulting polymer mixtures are termed "star branched butyls". A disadvantageous of this procedure is the necessity for separate, additional process steps for the polymerisation or halogenation of the branching agents. The simultaneous formation of linear and branched polymers during polymerisation is a characteristic of this procedure.

The production of "multi-arm star" polyisobutenes by the reaction of active polyisobutene polymers with divinylbenzene is described in Polymer Bull. 31 (1993) 665. These polyisobutenes are produced by the "arm-first, core-last" method, which is explained in U.S. Pat. No. 5,458,796. Another possibility for the production of branched butyl rubbers is the use of multi-functional initiators, as described in U.S. Pat. No. 5,084,522. This method is also termed the "core-first, arm-last" method. This procedure is also burdened with some disadvantages, on account of the separate process steps for the production of the multi-functional initiator and for the formation of homopolymers by transfer reactions.

SUMMARY OF THE INVENTION

The object of the present invention is therefore a single-stage process for producing highly branched polyisoolefines, which is characterised in that isoolefines, optionally in combination with conjugated or nonconjugated dienes, are polymerised in solution, suspension or in the gas phase in the presence of bifunctional monomers (inimers) which contain at least one group capable of cationic polymerisation and at least one group which serves as an initiator for the cationic polymerisation of isoolefines, at temperatures from +20 to −100° C., optionally in the presence of inert, organic solvents, and in the presence of alkylalumoxanes (coinitiator).

DESCRIPTION OF THE PREFERRED EMBODIMENTS

The isoolefines which are preferably used are those of formula

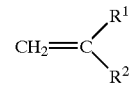

where $R^1$=Me and $R^2$ represents a $C_1$–$C_6$ alkyl such as methyl, ethyl or propyl. Isobutene and 2-methylbutene-1 are particularly preferred, especially isobutene. Conjugated or nonconjugated dienes which are suitable for the process according to the invention are those which contain 4 to 20, preferably 4 to 10, most preferably 4 to 6 carbon atoms, such as butadiene, isoprene, piperylene, 2,3 -dimethylbutadiene, 2,4-dimethylpentadiene-1,3, cyclopentadiene, methylcyclopentadiene, limonene, myrcene and/or 1,3-cyclohexadiene, preferably isoprene, piperylene and/or dimethylbutadiene, most preferably isoprene.

The production of butyl rubber, i.e. the copolymerisation of isobutene with isoprene, is quite particularly preferred.

Suitable bifunctional monomers (inimers) are aromatic and/or aliphatic vinyl and isoprene compounds of general formulae (I) to (III)

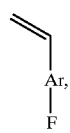

(I)

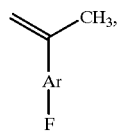

(II)

-continued

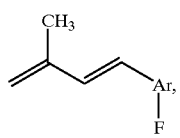

(III)

wherein
F corresponds to a functional organic group from the series —$CR^3_2X$, where X represents OR, Cl, Br, I, CN, $N_3$ or SCN and $R^3$ represents H and/or a $C_1$–$C_{20}$ alkyl, and
Ar represents $C_6H_4$ or $C_{10}H_8$.

The following radicals are particularly suitable as $C_1$–$C_{20}$ alkyl radicals: methyl, ethyl, propyl, butyl, hexyl, octyl, decyl and eicosyl, preferably methyl, ethyl and propyl, most preferably methyl.

Inimers of the following formula (IV) are preferably used in the process according to the invention:

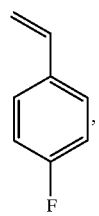

(IV)

wherein
F has the meaning given above.

The following are most preferably used as inimers: 4-vinylbenzyl chloride and/or 4-isoprenylbenzyl chloride.

The molar ratio of inimer to the monomers used is usually within the range from 1:10⁴ to 1:10, preferably 1:10³ to 1:50, most preferably 1:10 to 1:20.

During the copolymerisation of the isoolefines with the dienes which are copolymerisable with isoolefines, the molar ratio of isoolefines to copolymerisable monomers is usually 1:10³ to 1:10, preferably 1:12 to 1:50.

The process according to the invention can be conducted in the presence of inert organic solvents such as linear or branched hydrocarbons and/or linear and branched halogenated hydrocarbons, such as pentane, hexane and/or methylene chloride. In this respect, the amount of inert solvent used is not critical. The most suitable amount can easily be determined by appropriate preliminary tests.

In addition to the inimer, it is necessary to employ alkylalumoxanes as coinitiators for the process according to the invention. Suitable, preferred alkylalumoxanes are methyl, ethyl and/or butylalumoxanes, particularly methylalumoxanes, such as those described in Polyhedron, Vol. 7, No. 22/23 (1988), page 2375 et seq., for example.

In the process according to the invention, the alumoxanes and the said inimers are used in a molar ratio from 1:10⁴ to 1:10³, preferably from 1:10³ to 1:3, most preferably from 1:10² to 1:2.

Other suitable additives can also be added for the polymerisation according to the invention. Examples of suitable additives include electron donors such as dimethylacetamide and/or dimethyl sulphoxide, or proton acceptors such as di-tert.-butylpyridine (see U.S. Pat. No. 5,169,914, for example).

The inimer and the coinitiator can be added to the monomer mixture to be polymerised simultaneously, in succession, continuously or batch-wise. The alumoxanes also of course be produced in situ in the known manner, by the hydrolysis of corresponding aluminium alkyls.

The process according to the invention can be conducted within the temperature range from +20 to −100° C., preferably within the temperature range from −20 to −90° C. particularly from −40 to −80° C.

The process according to the invention can be conducted in solution, suspension or in the gas phase. It is preferably conducted in solution. It is also possible to conduct the process as a batch, flow or continuous process, where the reaction times or residence times range from 2 seconds to 20 hours, preferably from 60 seconds to 1 hour, particularly from 15 to 40 minutes.

As mentioned above, the process according to the invention results in highly branched polyisoolefines, wherein the degree of branching and the molecular weight are dependent in particular on the reactivity of the inimer, on the coinitiator, on the concentration of the coinitiator, on the molar ratio of monomer to inimer, on the reaction temperature and on the reaction time. It is therefore possible individually to adjust the degree of branching and the molecular weight of the polyisoolefine to be produced, by suitably varying the aforementioned parameters.

For example, the process according to the invention can be conducted in a manner such that the reactor, which is cooled to the reaction temperature, is charged with purified solvent and with the monomers, and after adjusting the temperature of the reactor to the desired reaction temperature the requisite amount of inimer is added and is stirred with the monomer mixture placed therein. The requisite amount of coinitiator is subsequently added and the reactor contents are vigorously and thoroughly mixed. All manipulations are carried out under an inert gas. The course of the polymerisation is followed by monitoring the generation of heat. After the completion of the exothermic reaction, the polymerisation is terminated, e.g. with 2,5-di-tert.-butyl-4-methoxyphenol dissolved in ethanol. The polymer obtained is then worked up in the usual manner, e.g. by stripping.

The advantages of the process according to the invention are due in particular to the simple single-step reaction procedure, wherein defined, highly branched polyisoolefines, preferably butyl rubbers, are obtained, which exhibit superior processing properties.

EXAMPLES

The polymers were investigated by gel permeation chromatography/viscosity coupling for the characterisation of their molecular weight distribution and degree of branching. The instrument for the GPC-viscosimetry coupling was equipped with eight Styragel columns of sizes 100, 1000 (2×), 10⁴(2×), 10⁵(2×) and 10⁶ angstroms and had a total length of 976 cm. The tetrahydrofuran elution medium was pumped at 0.5 ml/minute. 1.93 ml fractions were measured on-line in an Ubbelohde viscometer at 30° C. The $M_v$ values were calculated using the constants $K=5\times10^{-4}$ dl/g and α=0.6.

Example 1

1000 ml of dry hexane were placed in a 2 liter round bottom flask fitted with a stirrer and a thermometer, and were cooled to −60° C. and mixed with 100 mmole isoprene and with 100 mmole vinylbenzyl chloride (INIMER). 200 g isobutene were subsequently condensed in. Polymerization was initiated by the addition of 12 mmole methylaluminoxane (as a 30% solution in toluene) at −60° C. After stirring for three hours at −60° C., the reaction was stopped by adding ethanol. 134 g (conversion. 64.8%) of polymer were isolated. Characterisation by GPC/viscosimetry gave a molecular weight distribution with $M_n$=11 kg/mole and a degree of branching of about 73%. The Staudinger index was 0.3 dl/g. The gel content was 2.7%.

Example 2

This was performed analogously to Example 1, but with 220 g isobutene and 200 mmole vinylbenzyl chloride (INIMER). The conversion after 3 hours was 18.3%. The Staudinger index was 0.23 dl/g. The gel content was 4.6%. Characterisation by GPC/viscosimetry gave a molecular weight distribution with $M_n$=13 kg/mole, $M_w$=58 kg/mole, and a degree of branching of about 80%.

What is claimed is:

1. A single stage process for producing a highly branched polyisoolefin comprising polymerizing an isoolefin in the presence of at least one bifunctional monomer and at least one alkylalumoxane at a temperature of between about +20° C. and −100° C. in a media selected from the group consisting of a solution, a suspension, and a gas phase, the at least one bifunctional monomer including at least one group for (co)polymerizing in a cationic polymerization of the isoolefin and at least one group for initiating the cationic polymerization of the isoolefin.

2. The process according to claim 1, wherein the isoolefin is polymerized in the presence of one or more inert, organic solvents.

3. The process according to claim 1, wherein the isoolefin comprises a compound having the formula:

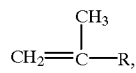

wherein R is a $C_1$–$C_6$ alkyl group.

4. The process according to claim 3, wherein the isoolefin comprises a compound selected from the group consisting of isobutene, 2-methyl-1-butene, and a mixture thereof.

5. The process according to claim 1, wherein the isoolefin is polymerized in the presence of one or more conjugated and/or nonconjugated dienes.

6. The process according to claim 5, wherein the one or more conjugated and/or nonconjugated dienes comprise a compound selected from the group consisting of butadiene, isoprene, piperylene, 2,3-dimethylbutadiene, 2,4-dimethylpentadiene, 1,3-cyclopentadiene, methylcyclopentadiene, limonene, myrcene, 1,3-cyclohexadiene, and a mixture thereof.

7. The process according to claim 6, wherein the one or more conjugated and/or nonconjugated dienes comprise isoprene, piperylene and/or 2,3-dimethylbutadiene.

8. The process according to claim 1, wherein the at least one bifunctional monomer comprises a compound having the formulas (I), (II) and/or (III):

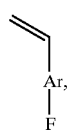

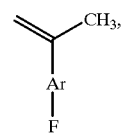

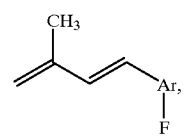

wherein

F is a functional organic group from the series —$CR^3_2X$, wherein

X is a functional group selected from the group consisting of OR, Cl, Br, I, CN, $N_3$ and SCN, $R^3$ is H and/or a $C_1$–$C_{20}$ alkyl group, and Ar is $C_6H_4$ or $C_{10}H_8$.

9. The process according to claim 8, wherein the at least one bifunctional monomer comprises a compound having the formula (I), and wherein Ar is $C_6H_4$.

10. The process according to claim 9, wherein the at least one bifunctional monomer comprises 4-vinylbenzyl chloride and/or 4-isoprenylbenzyl chloride.

11. The process according to claim 1, wherein the at least one alkylalumoxane comprises a compound selected from the group consisting of a methylalumoxane, an ethylalumoxane, a butylalumoxane, and a mixture thereof.

12. The process according to claim 1, wherein the at least one alkylalumoxane and the at least one bifunctional monomer are used in a molar ratio of between about 1:$10^4$ and 1:2.

13. The process according to claim 1, which is a batch, flow or continuous process.

14. A single stage, batch process for producing a highly branched polyisoolefin, comprising polymerizing an isoolefin in the presence of at least one bifunctional monomer and at least one alkylalumoxane, optionally, further in the presence of one or more conjugated and/or nonconjugated dienes, at a temperature of between about +20° C. and −100° C., in a media selected from the group consisting of a solution, a suspension, and a gas phase, optionally, in the presence of one or more inert, organic solvents, wherein the process is a batch and the at least one bifunctional monomer includes at least one group for (co)polymerizing in a cationic polymerization of the isoolefin and at least one group for initiating the cationic polymerization of the isoolefin.

15. The process according to claim 14, wherein the isoolefin comprises a compound having the formula:

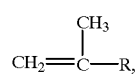

where R is a $C_1$–$C_6$ alkyl group.

* * * * *